(12) United States Patent
Song et al.

(10) Patent No.: US 10,763,041 B2
(45) Date of Patent: Sep. 1, 2020

(54) MULTILAYER CERAMIC CAPACITOR AND METHOD OF MANUFACTURING THE SAME

(71) Applicant: SAMSUNG ELECTRO-MECHANICS CO., LTD., Suwon-si OT (KR)

(72) Inventors: Seung Woo Song, Suwon-si (KR); Jin Kyung Joo, Suwon-si (KR); Hyo Youn Lee, Suwon-si (KR); Taek Jung Lee, Suwon-si (KR); Sung Kwon An, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 56 days.

(21) Appl. No.: 16/003,792

(22) Filed: Jun. 8, 2018

(65) Prior Publication Data

US 2019/0066924 A1    Feb. 28, 2019

(30) Foreign Application Priority Data

Aug. 31, 2017 (KR) .................. 10-2017-0110690

(51) Int. Cl.
*H01G 4/232* (2006.01)
*H01G 4/12* (2006.01)
(Continued)

(52) U.S. Cl.
CPC ............ *H01G 4/232* (2013.01); *H01G 4/012* (2013.01); *H01G 4/12* (2013.01); *H01G 4/30* (2013.01)

(58) Field of Classification Search
CPC ........ H01G 4/38; H01G 4/012; H01G 4/1227; H01G 4/12; H01G 4/30; H01G 4/232;
(Continued)

(56) References Cited

U.S. PATENT DOCUMENTS

2012/0018204 A1    1/2012    Sato et al.
2015/0124371 A1    5/2015    Park et al.
(Continued)

FOREIGN PATENT DOCUMENTS

CN    107004504 A    8/2017
JP    2001-313230 A    11/2001
(Continued)

OTHER PUBLICATIONS

Office Action issued in Chinese Patent Application No. 201810979614.7 dated Mar. 3, 2020 (with English Translation).

*Primary Examiner* — Michael P McFadden
(74) *Attorney, Agent, or Firm* — Morgan, Lewis & Bockius LLP

(57) ABSTRACT

A multilayer ceramic capacitor includes a capacitive portion, a protective part, and first and second connecting electrodes. The capacitive portion includes a first dielectric layer and first and second internal electrodes disposed with the first dielectric layer interposed therebetween. The protective part is disposed on one surface of the capacitive portion and includes a second dielectric layer and first and second electrode patterns disposed to be spaced apart from each other. The first connecting electrode penetrates through the protective part and the capacitive portion and is connected to the first internal electrode and the first electrode pattern, and the second connecting electrode penetrates through the protective part and the capacitive portion and is connected to the second internal electrode and the second electrode pattern.

24 Claims, 6 Drawing Sheets

(51) Int. Cl.
*H01G 4/012* (2006.01)
*H01G 4/30* (2006.01)

(58) Field of Classification Search
CPC ............... H01L 21/4857; H01L 21/486; H01L 23/49822; H01L 23/49827; H01L 23/49838
USPC ...................................................... 361/301.4
See application file for complete search history.

(56) References Cited

U.S. PATENT DOCUMENTS

| | | |
|---|---|---|
| 2016/0163463 A1 | 6/2016 | Namikawa et al. |
| 2017/0278635 A1 | 9/2017 | Mizuno et al. |
| 2017/0332491 A1* | 11/2017 | Miyauchi ............... H01C 7/105 |
| 2018/0068796 A1* | 3/2018 | Seo ........................ H01G 4/228 |

FOREIGN PATENT DOCUMENTS

| | | |
|---|---|---|
| JP | 4748317 B2 | 8/2011 |
| JP | 2016-111182 A | 6/2016 |
| JP | 2017-0175039 A1 | 9/2017 |
| KR | 10-2015-0052510 A | 5/2015 |

\* cited by examiner

MULTILAYER CERAMIC CAPACITOR AND METHOD OF MANUFACTURING THE SAME

CROSS-REFERENCE TO RELATED APPLICATION

This application claims benefit of priority to Korean Patent Application No. 10-2017-0110690 filed on Aug. 31, 2017 in the Korean Intellectual Property Office, the disclosure of which is incorporated herein by reference in its entirety.

BACKGROUND

1. Field

The present disclosure relates to a multilayer ceramic capacitor and a method of manufacturing the same.

2. Description of Related Art

As the performance of electronic products, such as computers and the like, improves, components therein including multilayer ceramic capacitors (MLCCs) are expected to have high capacity and high reliability.

Further, with the miniaturization of mobile communication devices and electronic devices, MLCCs are also required to be smaller and thinner.

Accordingly, development is ongoing of an MLCC in which a via or a through hole is formed, a via electrode connected to an internal electrode is formed by filling the via or the through hole with a conductive material, and a bottom electrode to be connected to the via electrode is formed.

SUMMARY

An aspect of the present disclosure may provide a multilayer ceramic capacitor in which deformation of internal electrodes is prevented or minimized, while ensuring high capacity, and a method of manufacturing the same.

According to an aspect of the present disclosure, a multilayer ceramic capacitor may include a capacitive portion, a protective portion, and first and second connecting electrodes. The capacitive portion includes a first dielectric layer and first and second internal electrodes disposed with the first dielectric layer interposed therebetween. The protective part is disposed on one surface of the capacitive portion and includes a second dielectric layer and first and second electrode patterns formed to be spaced apart from each other on a same surface of the second dielectric layer. The first connecting electrode penetrates through the protective part and the capacitive portion and is connected to the first internal electrode and the first electrode pattern. The second connecting electrode penetrates through the protective part and the capacitive portion and is connected to the second internal electrode and the second electrode pattern.

According to another aspect of the present disclosure, a method of manufacturing a multilayer ceramic capacitor may include preparing a body including a capacitive portion including a first dielectric layer and first and second internal electrodes disposed with the first dielectric layer interposed therebetween and a protective part disposed on one surface of the capacitive portion and including a second dielectric layer and first and second electrode patterns formed to be spaced apart from each other on a same surface of the second dielectric layer. A first via and a second via are formed penetrating through the body, and the first via and the second via are filled with a conductive material to form first and second connecting electrodes.

According to a further aspect of the present disclosure, a multilayer ceramic capacitor includes a capacitance formation portion, a protective part, first and second connecting electrodes, and first and second external electrodes. The capacitance formation portion includes a plurality of first and second internal electrodes overlapping each other in a stacking direction with dielectric layers disposed therebetween. The protective part is disposed on the capacitance formation portion in the stacking direction, and the protective part includes a dielectric layer having first and second electrode patterns disposed adjacent to each other on a same surface of the dielectric layer parallel to the first and second internal electrodes. The first and second connecting electrodes are each disposed in a respective via hole extending through the protective part and into the capacitance formation portion, such that the first connecting electrode extends through the first electrode pattern and is connected to the first internal electrode, and the second connecting electrode extends through the second electrode pattern and is connected to the second internal electrode. The first and second external electrodes are disposed on ends of the first and second connecting electrodes, respectively.

BRIEF DESCRIPTION OF DRAWINGS

The above and other aspects, features, and other advantages described in the present disclosure will be more clearly understood from the following detailed description taken in conjunction with the accompanying drawings, in which.

DETAILED DESCRIPTION

Exemplary embodiments will now be described in detail with reference to the accompanying drawings.

Figure 1:
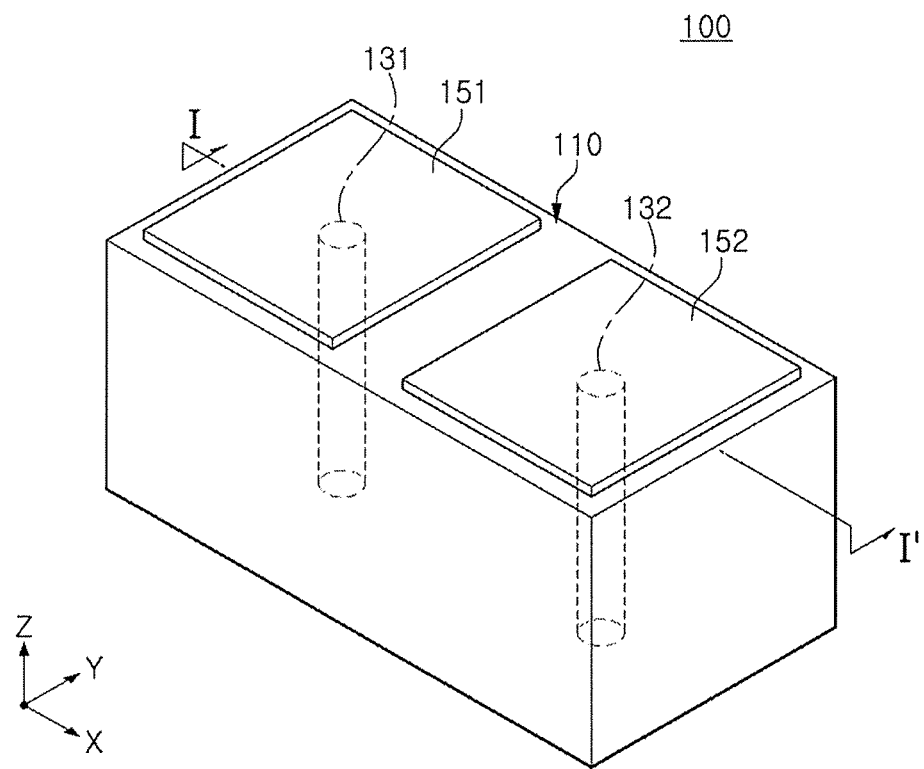
FIG. 1 is a perspective view schematically illustrating a multilayer ceramic capacitor (MLCC) according to an exemplary embodiment.
Figure 2:
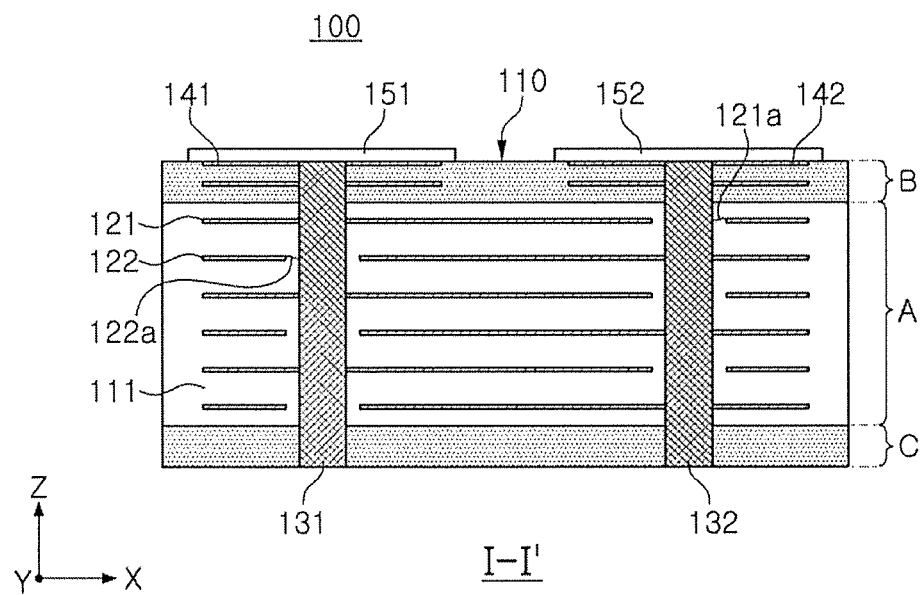
FIG. 2 is a schematic cross-sectional view of the MLCC of FIG. 1, taken along line I-I'.

FIG. 1 is a perspective view schematically illustrating a multilayer ceramic capacitor (MLCC) according to an exemplary embodiment, and FIG. 2 is a schematic cross-sectional view of the MLCC of FIG. 1, taken along line I-I'.

A structure of the MLCC 100 according to an exemplary embodiment will be described with reference to FIGS. 1 and 2.

A body 110 is formed by stacking a plurality of dielectric layers 111 and may be obtained by laminating a plurality of green sheets and subsequently sintering the laminated green sheets. Through the sintering, a plurality of dielectric layers 111 may have an integrated form. The shape and dimensions of the body 110 and the number of stacked dielectric layers 111 are not limited to those illustrated in the present exemplary embodiment. As illustrated in FIG. 1, the body 110 may have a rectangular parallelepiped shape, for example.

The dielectric layer 111 included in the body 110 may include a ceramic material having a high dielectric constant. For example, the dielectric layer 111 may include a barium titanate (BaTiO$_3$)-based or a strontium titanate (SrTiO$_3$)-based material, but other appropriate materials may also be used as long as sufficient capacitance can be obtained with the use thereof. The dielectric layer 111 may further include an additive, an organic solvent, a plasticizer, a binder, a dispersant, and the like, if necessary, together with the ceramic material as a main component, and here, the dielectric layer 111 may include the same material as that added to internal electrodes 121 and 122, as an additive, and a concentration of the additive is appropriately adjusted locally, to ensure uniform sintering properties.

The body 110 may be formed by stacking four or more dielectric layers 111. For example, the body 110 may be formed by stacking 400 to 500 dielectric layers.

A capacitive portion A including the dielectric layer 111 and the first and second internal electrodes 121 and 122 disposed with the dielectric layers 111 interposed therebetween is formed on the inner side of the body 110. The first and second internal electrodes 121 and 122 may be connected to different external electrodes 151 and 152 and have different polarities when driven. The first and second internal electrodes 121 and 122 may be obtained by printing a paste containing a conductive metal to have a predetermined thickness on one surface of a ceramic green sheet formed of a dielectric layer and subsequently sintering the same. A main constituent material of the first and second internal electrodes 121 and 122 may be nickel (Ni), copper (Cu), palladium (Pd), silver (Ag), and the like, and alloys thereof may also be used.

Here, the first and second internal electrodes 121 and 122 may include first and second insulation portions 121a and 122a, respectively. The first and second insulating portions 121a and 122a refer to regions in which the first and second internal electrodes 121 and 122 are not formed, and serve to allow the first and second internal electrodes 121 and 122 to only be connected to external electrodes having different polarities. That is, a first connecting electrode 131 is separated from the second internal electrode 122 by the second insulation portion 122a disposed in each second internal electrode 122; and the second connecting electrode 132 is separated from the first internal electrode 121 by the first insulation portion 121a disposed in each first internal electrode 121.

Since the first and second internal electrodes 121 and 122 are connected to the first and second external electrodes 151 and 152 by the first and second connecting electrodes 131 and 132, respectively, an area in which the first and second internal electrodes 121 and 122 overlap each other with the dielectric layer 111 interposed therebetween may be maximized, significantly increasing capacitance of the MLCC 100.

A protective part B including the dielectric layer 111 and first and second electrode patterns 141 and 142 formed to be spaced apart from each other is formed on one surface of the capacitive portion A. The first and second electrode patterns 141 and 142 are connected to the first and second external electrodes 151 and 152, respectively, to have different polarities when driven.

Figure 7:
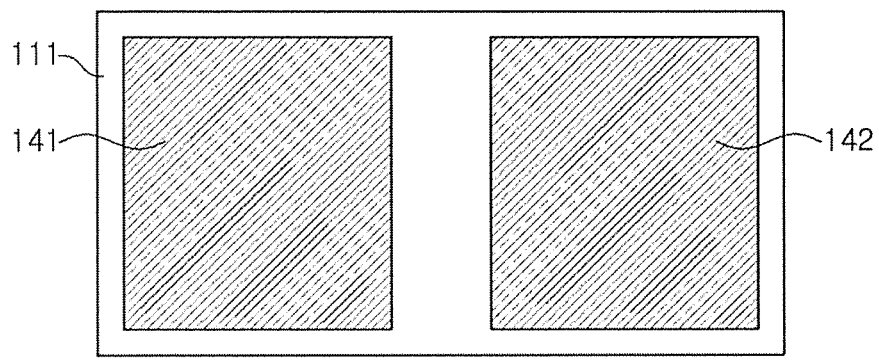

As illustrated in FIG. 7, the protective part B is formed by printing a paste containing a conductive metal to have a predetermined thickness on one surface of a ceramic green sheet formed of the dielectric layer 111 in two separate regions so as to be spaced apart from each other to form the first and second electrode patterns 141 and 142, stacking one or more sheets including the first and second electrode patterns 141 and 142, and subsequently sintering the same.

In order to prevent the first and second electrode patterns 141 and 142 from being electrically connected, a distance between the first and second electrode patterns 141 and 142 may be 1 μm or greater.

The area of each of the first and second electrode patterns 141 and 142 may be set to be greater than an area in which the first and second connecting electrodes 131 and 132 penetrate through the body 110 in order to sufficiently prevent the dielectric layer from being pushed when a via is formed. A shape of the first and second electrode patterns 141 and 142 is not limited and may have a shape such as a rectangle or a circle.

The main constituent materials of the first and second electrode patterns 141 and 142 may be the same as those of the first and second internal electrodes 121 and 122.

The protective part B may be formed on an upper or lower portion (or surface) of the body or may be formed on both the upper and lower portions (or surfaces) of the body. When the protective part B is only disposed on one surface of the capacitive portion A, that is, only on the upper or lower portion of the body, a cover part C including only the dielectric layer may be formed on a surface opposing the surface on which the protective part B is formed (e.g., as shown in FIG. 2).

In the related art, the cover part C including only the dielectric layer 111, without an internal electrode or electrode pattern, is formed on the upper and lower surfaces of the capacitive portion A. However, in the MLCC according to the exemplary embodiment, since the protective part B including the dielectric layer 111 and the first and second electrode patterns 141 and 142 formed to be spaced apart from each other is provided, deformation of the internal electrodes may be prevented or minimized.

Figure 3:
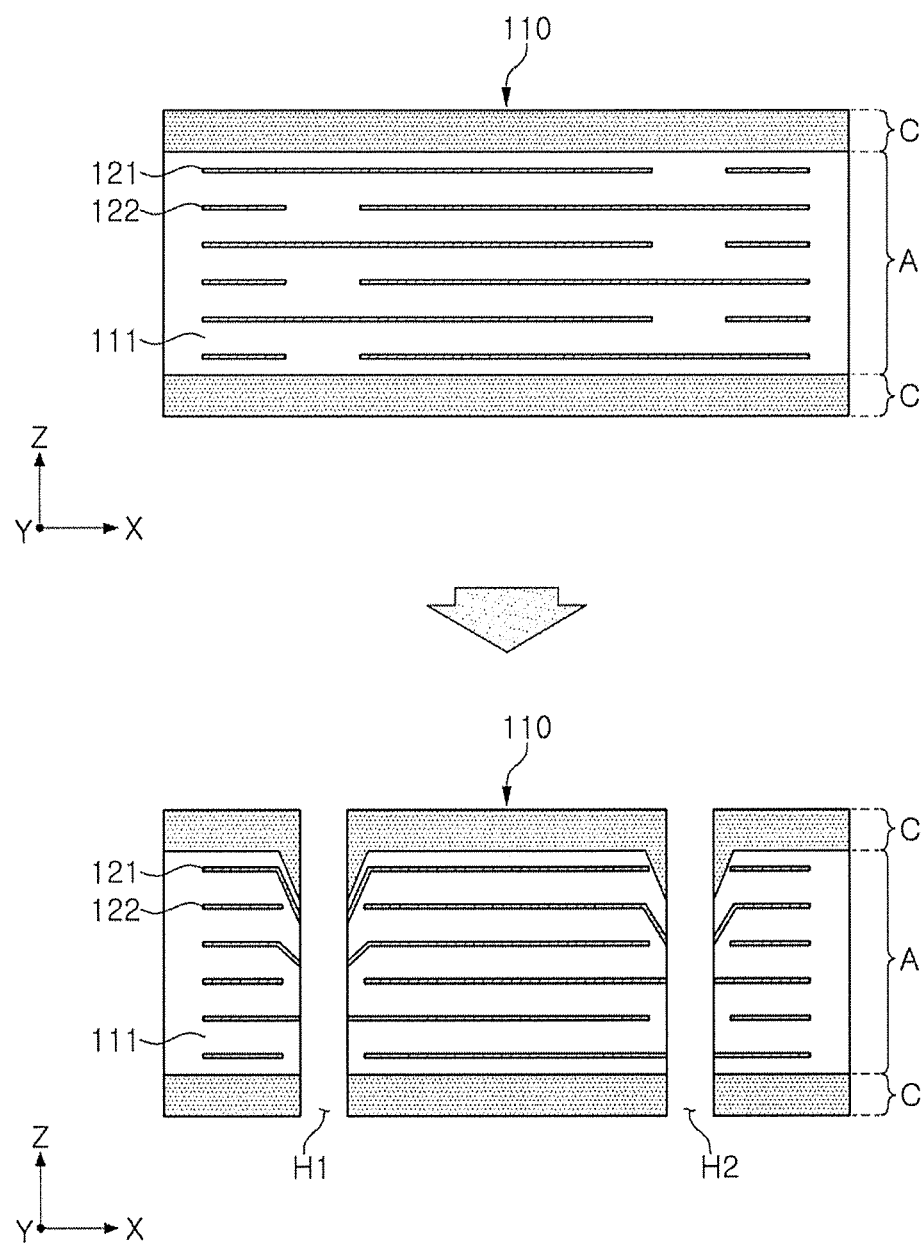
FIG. 3 is a view illustrating a process of forming vias of an MLCC having a cover part including only a dielectric layer.
Figure 4:
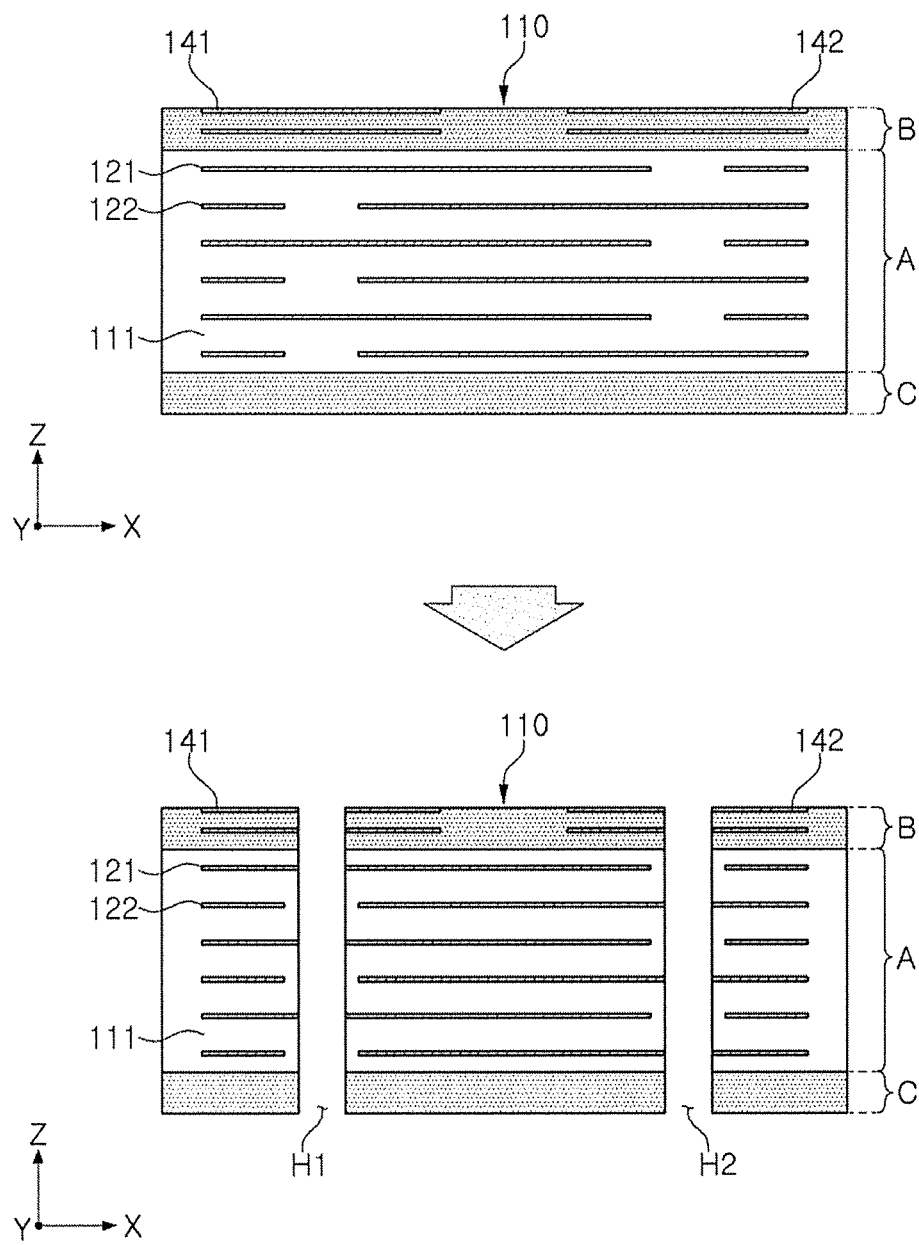
FIG. 4 is a view illustrating a process of forming vias of an MLCC having a protective part according to an exemplary embodiment.

FIG. 3 is a view illustrating a process of forming vias H1 and H2 of an MLCC having the cover part C including only a dielectric layer 111. FIG. 4 is a view illustrating a process of forming vias H1 and H2 of an MLCC having the protective part B.

In order to connect the internal electrodes and the external electrodes, the vias H1 and H2 are formed and subsequently filled with a conductive material to form connecting electrodes. In order to form a via, a physical penetration method is generally used. For example, the vias H1 and H2 may be formed using a laser drill, a mechanical pin puncher, and the like.

In the case of forming the vias H1 and H2 in the MLCC having the cover part C including only the dielectric layer 111 as in the related art, a phenomenon in which the dielectric layer is pushed downwards due to high pressure may occur and deform the internal electrodes in the upper portion of the capacitive portion A to cause a short-circuit, as illustrated in FIG. 3.

In contrast, the MLCC according to an exemplary embodiment includes the protective part B including the dielectric layer 111 and the first and second electrode patterns 141 and 142 formed to be spaced apart from each other, whereby the phenomenon in which the dielectric layer is pushed downwards is suppressed, thereby preventing or minimizing deformation of the internal electrodes as illustrated in FIG. 4.

The first external electrode 151 is disposed on one surface of the body 110 and connected to the first connecting electrode 131 and the second external electrode 152 is disposed on one surface of the body 110 and connected to the second connecting electrode 132. Also, the first and second external electrodes 151 and 152 may directly be connected to the first and second electrode patterns 141 and 142, respectively.

The first connecting electrode 131 is connected to the first internal electrode(s) 121 and the first electrode pattern(s) 141, and the second connecting electrode 132 is connected to the second internal electrode(s) 122 and the second electrode pattern(s) 142.

The first and second connecting electrodes 131 and 132 may be formed by filling the vias H1 and H2 penetrating through the body 110 with a conductive material.

Meanwhile, the first and second external electrodes 151 and 152 may be disposed on only one surface of the body 110. In this manner, the first and second external electrodes 151 and 152 disposed on only one surface of the body 110 may be defined as bottom electrodes. The MLCC 100 having such a bottom electrode structure may reduce a marginal part on the side surface connecting the upper surface and the lower surface of the body 110 to increase a region for forming the first and second internal electrodes 121 and 122, significantly enhancing capacitance of the MLCC 100. That is, since the MLCC 100 according to an exemplary embodiment has the bottom electrode structure and the structure in which the internal electrodes are connected to the external electrodes through the connecting electrodes penetrating through the body, capacitance of the MLCC 100 may further be improved.

FIG. 4 is a view illustrating a process of forming vias of an MLCC having the protective part B according to an exemplary embodiment.

FIGS. 5 through 8 are views illustrating sheets used for manufacturing an MLCC according to an exemplary embodiment.

FIGS. 9 through 12 are views illustrating shapes of the sheets of FIGS. 5 through 8 and connecting electrodes after forming vias and filling the vias with a conductive material to form the connecting electrodes.

A method of manufacturing the MLCC illustrated in FIGS. 1 and 2 will be described with reference to FIGS. 4 through 12. From the description of the manufacturing method, the structure of the above-described MLCC may be further clarified.

Figure 5:
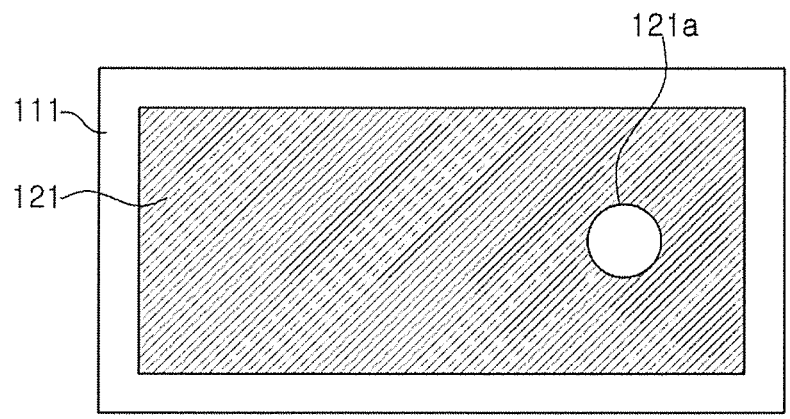
FIGS. 5 through 8 are views illustrating sheets used in manufacturing an MLCC according to an exemplary embodiment.
Figure 6:
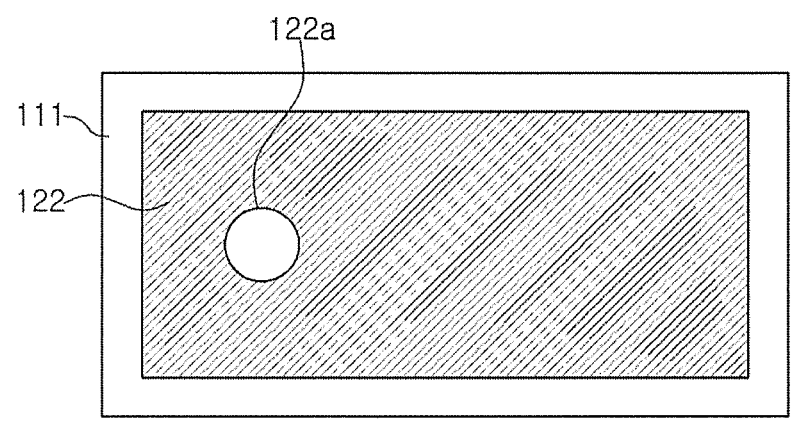

First, a sheet formed of a paste containing a conductive metal and having a predetermined thickness is printed on one surface of a ceramic green sheet formed of a dielectric layer. The sheet further includes a through-hole (shown at 121a or 122a in FIGS. 5 and 6) through which the ceramic green sheet is exposed. FIG. 5 shows a sheet for forming the first internal electrode 121 and FIG. 6 is a sheet for forming the second internal electrode 122. By alternately stacking the sheets of FIGS. 5 and 6, the capacitive portion A including the dielectric layer 111 and the first and second internal electrodes 121 and 122 with the dielectric layer 111 interposed therebetween is prepared.

Thereafter, on one surface of the capacitive portion A, at least one sheet on which the first and second electrode patterns 141 and 142 are formed is stacked to form the protective part B. The at least one sheet is formed by printing a paste including a conductive metal with a predetermined thickness in two regions on one surface of the ceramic green sheet formed of the dielectric layer 111, as illustrated in FIG. 7. The at least one sheet is then stacked on one surface of the capacitive portion A to form the protective part B, thereby forming a body.

Figure 8:
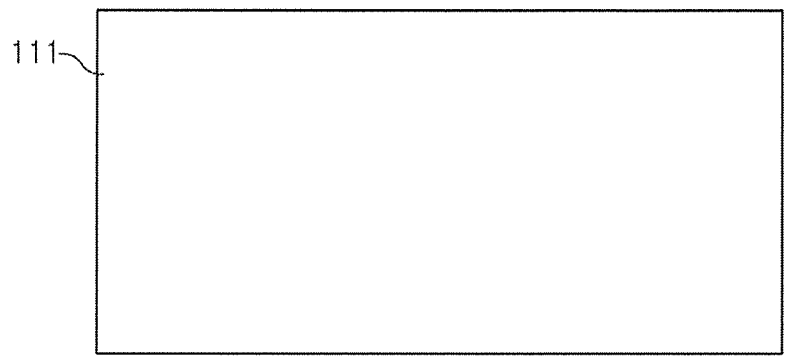

On a surface opposing the one surface on which the protective part B is formed, at least one sheet formed of only the dielectric layer 111 illustrated in FIG. 8 is stacked to form the cover part C.

On the other hand, a second protective part B, rather than the cover part C, may be formed on the surface opposing the surface on which the protective part B is formed. That is, protective parts B may be formed on both sides of the capacitive portion A. In this case, there is no restriction in directionality when a via is formed.

Thereafter, as illustrated in FIG. 4, the via holes H1 and H2 are formed in the body using a physical penetration method. The first and second connecting electrodes 131 and 132 are formed by filling the via holes H1 and H2 with a conductive material.

Figure 9:
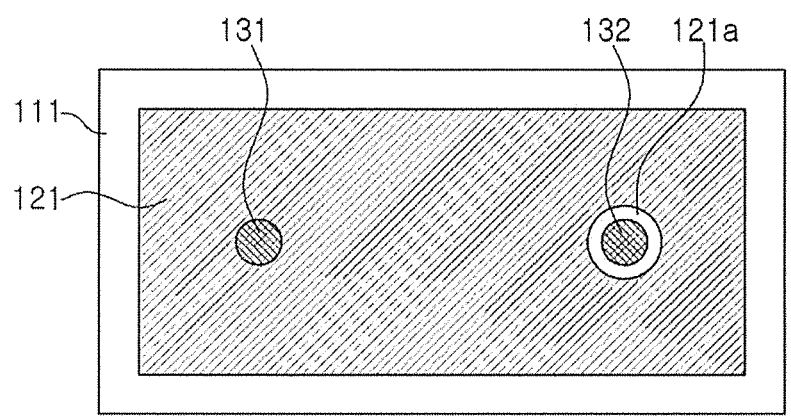
FIGS. 9 through 12 are views illustrating the sheets of FIGS. 5 through 8 having connecting electrodes extending therethrough after forming vias and filling the vias with a conductive material to form connecting electrodes.
Figure 10:
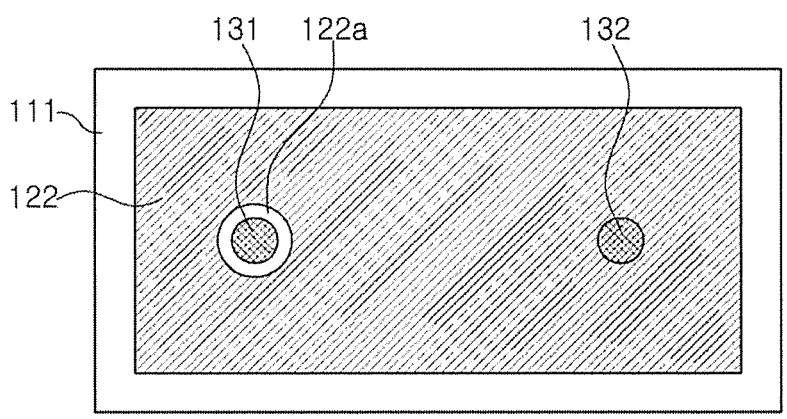
Figure 11:
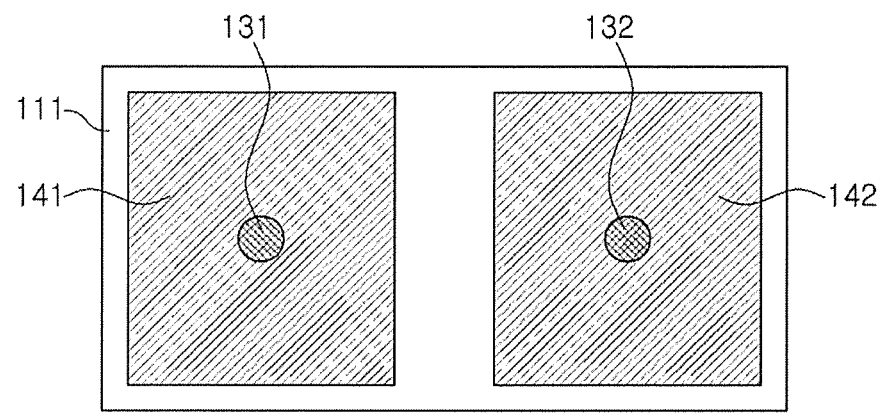
Figure 12:
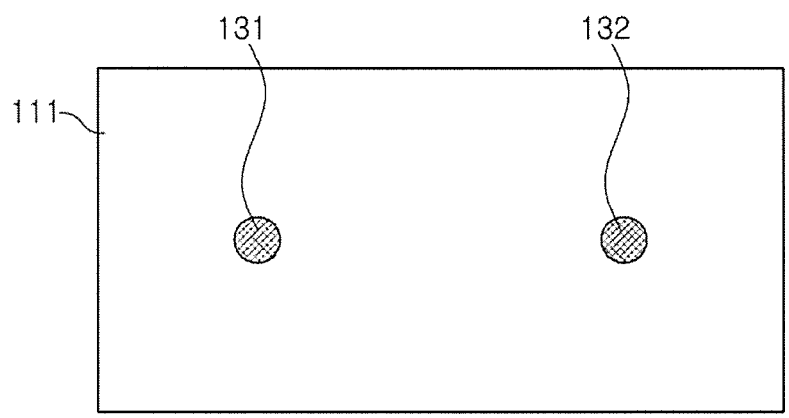

FIGS. 9 through 12 illustrate configurations of the sheets of FIGS. 5 through 8 and the connecting electrodes after the first and second connecting electrodes 131 and 132 are formed by filling the via holes H1 and H2 with a conductive material. As shown in FIGS. 9 and 11, the first connecting electrode 131 is connected to the first internal electrode 121 and the first electrode pattern 141 through direct contact. As shown in FIG. 10, the first connecting electrode 131 is separated from the second internal electrode 122 by the second insulation portion 122a.

The second connecting electrode 132 is connected to the second internal electrode 122 and the second electrode pattern 142 through direct contact, as shown in FIGS. 10 and 11, and is separated from the first internal electrode 121 by the first insulation portion 121a, as shown in FIG. 9.

Thereafter, the first external electrode 151 connected to the first connecting electrode 131 and the second external electrode 152 connected to the second connecting electrode 132 are formed on one surface of the body 110, thereby completing the MLCC illustrated in FIGS. 1 and 2.

As set forth above, since the MLCC according to exemplary embodiments includes the protective part including the dielectric layer and the first and second electrode patterns formed to be spaced apart from each other, deformation of the internal electrodes is prevented or minimized.

Also, since the first and second internal electrodes are connected to the first and second external electrodes using the first and second connecting electrodes, the area in which the first and second internal electrodes overlap in the stacking direction is increased, increasing capacitance of the MLCC.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
a capacitive portion including a first dielectric layer and first and second internal electrodes disposed with the first dielectric layer interposed therebetween;
a protective part disposed on one surface of the capacitive portion and including a second dielectric layer and first and second electrode patterns disposed to be spaced apart from each other on a same surface of the second dielectric layer;
a first connecting electrode penetrating through the protective part, the first electrode pattern, and the capacitive portion and connected to the first internal electrode and the first electrode pattern; and
a second connecting electrode penetrating through the protective part, the second electrode pattern, and the capacitive portion and connected to the second internal electrode and the second electrode pattern.

2. The multilayer ceramic capacitor of claim 1, wherein the protective part is only disposed on the one surface of the capacitive portion.

3. The multilayer ceramic capacitor of claim 2, wherein a cover part including only a third dielectric layer is disposed on a surface of the capacitive portion opposing the one surface on which the protective part is disposed.

4. The multilayer ceramic capacitor of claim 1, wherein a distance between the first electrode pattern and the second electrode pattern is 1 μm or greater.

5. The multilayer ceramic capacitor of claim 1, wherein an area of each of the first and second electrode patterns is greater than an area in which the first and second connecting electrodes penetrate through a body.

6. The multilayer ceramic capacitor of claim 1, further comprising:
a first external electrode disposed on one surface of the multilayer ceramic capacitor and connected to the first connecting electrode; and
a second external electrode disposed on one surface of the multilayer ceramic capacitor, separated from the first external electrode, and connected to the second connecting electrode.

7. The multilayer ceramic capacitor of claim 6, wherein the first and second external electrodes are directly connected to the first and second electrode patterns, respectively.

8. The multilayer ceramic capacitor of claim 6,
wherein the first and second external electrodes are disposed on only one surface of the multilayer ceramic capacitor.

9. The multilayer ceramic capacitor of claim 1, wherein the first and second electrode patterns are formed of a same material as the first and second internal electrodes.

10. The multilayer ceramic capacitor of claim 1, wherein the first connecting electrode penetrates integrally through the protective part, the first electrode pattern, and the first internal electrode, and the second connecting electrode penetrates integrally through the protective part, the second electrode pattern, and the second internal electrode.

11. The multilayer ceramic capacitor of claim 1, wherein the first connecting electrode penetrates through and directly contacts the first internal electrode, the first electrode pattern, and the second dielectric layer of the protective part, and the second connecting electrode penetrates through and directly contacts the second internal electrode, the second electrode pattern, and the second dielectric layer of the protective part.

12. The multilayer ceramic capacitor of claim 1, wherein an area of each of the first and second electrode patterns on the same surface of the second dielectric layer is greater than an area of each of the first and second connecting electrodes on the same surface of the second dielectric layer.

13. The multilayer ceramic capacitor of claim 1, wherein a thickness of each of the first and second electrode patterns in the protective part is smaller than a thickness of the protective part, and smaller than a length of a portion of the first and second connecting electrodes extending through the protective part and the first or second electrode pattern.

14. A method of manufacturing a multilayer ceramic capacitor, the method comprising:
preparing a body including a capacitive portion including a first dielectric layer and first and second internal electrodes disposed with the first dielectric layer interposed therebetween and a protective part disposed on one surface of the capacitive portion and including a second dielectric layer and first and second electrode patterns formed to be spaced apart from each other on a same surface of the second dielectric layer;
forming a first via and a second via each penetrating through the capacitive portion and the protective part of the body, the first via penetrating through the first internal electrode and the first electrode pattern and the second via penetrating through the second internal electrode and the second electrode pattern; and
filling the first via and the second via with a conductive material to form a first connecting electrode connected to the first internal electrode and the first electrode pattern and to form a second connecting electrode connected to the second internal electrode and the second electrode pattern.

15. The method of claim 14, wherein
the first via and the second via are formed by a physical penetration method.

16. The method of claim 14, wherein the preparing of the body includes:
forming the capacitive portion by alternately stacking a first sheet including the first dielectric layer and the first internal electrode formed on the first dielectric layer and a second sheet including a third dielectric layer and the second internal electrode formed on the third dielectric layer;
forming the protective part by stacking at least one sheet including the second dielectric layer and first and second electrode patterns formed to be spaced apart from each other on a surface of the second dielectric layer,
wherein the protective part is formed to be stacked on one surface of the capacitive portion.

17. The method of claim 14, wherein
the protective part is only disposed on the one surface of the capacitive portion.

18. The method of claim 17, wherein
a cover part including only a fourth dielectric layer is formed on a surface of the capacitive portion opposing the one surface on which the protective part is disposed.

19. The method of claim 14, further comprising:
forming a first external electrode connected to the first connecting electrode and a second external electrode spaced apart from the first external electrode and connected to the second connecting electrode, on one surface of the multilayer ceramic capacitor.

20. The method of claim 14, wherein the forming of the first via and the second via comprises physically penetrating the protective part prior to penetrating the capacitive portion, and
the first via penetrates through the first electrode pattern and the second via penetrates through the second electrode pattern.

21. A multilayer ceramic capacitor comprising:
a capacitance formation portion including a plurality of first and second internal electrodes overlapping each other in a stacking direction with dielectric layers disposed therebetween;
a protective part disposed on the capacitance formation portion in the stacking direction, the protective part including a dielectric layer having first and second electrode patterns disposed adjacent to each other on a same surface of the dielectric layer parallel to the first and second internal electrodes;

first and second connecting electrodes each disposed in a respective via hole extending through the protective part and into the capacitance formation portion, wherein the first connecting electrode extends through the first electrode pattern and is connected to the first internal electrode, and the second connecting electrode extends through the second electrode pattern and is connected to the second internal electrode; and first and second external electrodes disposed on ends of the first and second connecting electrodes, respectively.

22. The multilayer ceramic capacitor of claim 21, wherein each first internal electrode has a through-hole, and the second connecting electrode extends through the through-hole of the first internal electrode and is spaced apart from the first internal electrode by the through-hole, and each second internal electrode has a through-hole, and the first connecting electrode extends through the through-hole of the second internal electrode and is spaced apart from the second internal electrode by the through-hole.

23. The multilayer ceramic capacitor of claim 22, wherein the first electrode pattern overlaps in the stacking direction with the through-hole of each second internal electrode, and the second electrode pattern overlaps in the stacking direction with the through-hole of each first internal electrode.

24. The multilayer ceramic capacitor of claim 21, wherein the protective part includes a plurality of dielectric layers each having first and second electrode patterns disposed adjacent to each other on a same surface thereof, and the first connecting electrode contacts each of the first electrode patterns of the plurality of dielectric layers, and the second connecting electrode contacts each of the second electrode patterns of the plurality of dielectric layers.

* * * * *